United States Patent [19]

Anders

[11] 4,344,282
[45] Aug. 17, 1982

[54] COMPRESSOR BLEED SYSTEM

[75] Inventor: Larry E. Anders, Palm Springs, Fla.

[73] Assignee: United Technologies Corporation, Hartford, Conn.

[21] Appl. No.: 217,071

[22] Filed: Dec. 16, 1980

[51] Int. Cl.³ .............................................. F02C 3/06
[52] U.S. Cl. .................... 60/226 R; 60/262; 60/39.07; 137/625.28; 415/145
[58] Field of Search ............... 60/226 R, 262, 39.07; 137/625.28; 251/145, DIG. 2; 415/145, 150, 156

[56] References Cited

U.S. PATENT DOCUMENTS

| | | | |
|---|---|---|---|
| 1,601,737 | 10/1926 | Johnson | 251/DIG. 2 |
| 3,062,237 | 11/1962 | Coplen | 137/625.28 |
| 3,074,432 | 1/1963 | Beale | 137/625.28 |
| 3,154,241 | 10/1964 | Kent | 415/150 |

*Primary Examiner*—Douglas Hart
*Attorney, Agent, or Firm*—Jack N. McCarthy

[57] ABSTRACT

A fan engine having a core engine and a fan duct has bleed ports positioned circumferentially around the compressor housing of the core engine to bleed flow into the fan duct. A strap covers the circumferential line of holes and it is moved between an open and closed position by a U-shaped flexure element which biases the bleed port seal strap to an open position while an actuator moves the seal strap to a position to close the bleed ports. The ends of said U-shaped flexure elements are connected to the ends of the seal strap and are connected to links which insure that the ends of the strap are moved in a predetermined path.

4 Claims, 7 Drawing Figures

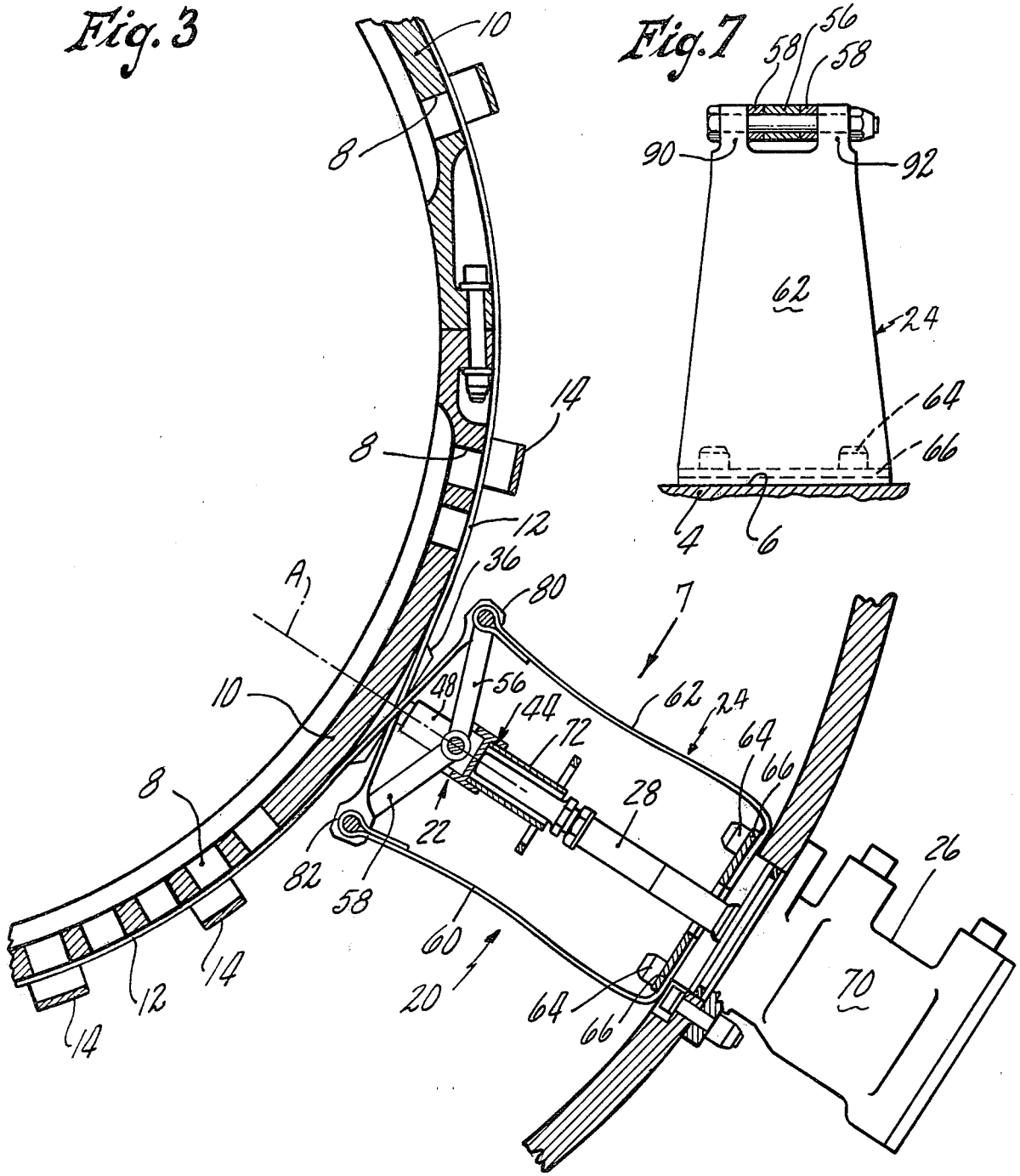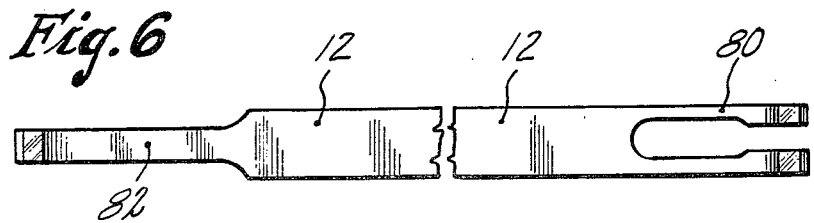

COMPRESSOR BLEED SYSTEM

TECHNICAL FIELD

This invention relates to a device for actuating a compressor bleed port seal strap for a compressor start bleed system. While bleed port seal straps have been used in the past, this actuating system provides a simpler, lighter, and more reliable scheme.

DISCLOSURE OF INVENTION

A primary object of this invention is to provide a simplified compressor bleed system which will reduce actuator blockage in the fan duct.

In accordance with the present invention, the U-shaped flexure element reduces the number of moving parts, thereby eliminating wear problems due to vibration and complex machining operations.

It is an object of this invention to provide a closed loop load path between the bleed port seal strap and the actuator. The closed loop load path is accomplished with a flexure element. Actuator reaction load, strap end positioning, and strap return spring force, are all accomplished by the flexure member.

It is another object of the invention to provide an actuating means for the bleed port seal strap which is not sensitive to thermal growth of the outer fan duct relative to the inner compressor case since thermal growth differences are taken out as a change in a radial direction which is perpendicular to the strap ends.

It is a further object of this invention to provide an actuating means that has all pinned joints as opposed to cam surfaces sensitive to wear and binding in a vibratory environment.

BRIEF DESCRIPTION OF DRAWINGS

FIG. 3 is a fragmentary view of the compressor housing and an outer casing showing the positioning of the actuating means for controlling the bleed port seal strap, with the seal strap shown in a closed position;

FIG. 6 is a view showing both ends of the bleed port seal strap; and

FIG. 7 is a view taken on line 7—7 of the side of the flexure element as seen in FIG. 3.

BEST MODE FOR CARRYING OUT THE INVENTION

Figure 1:
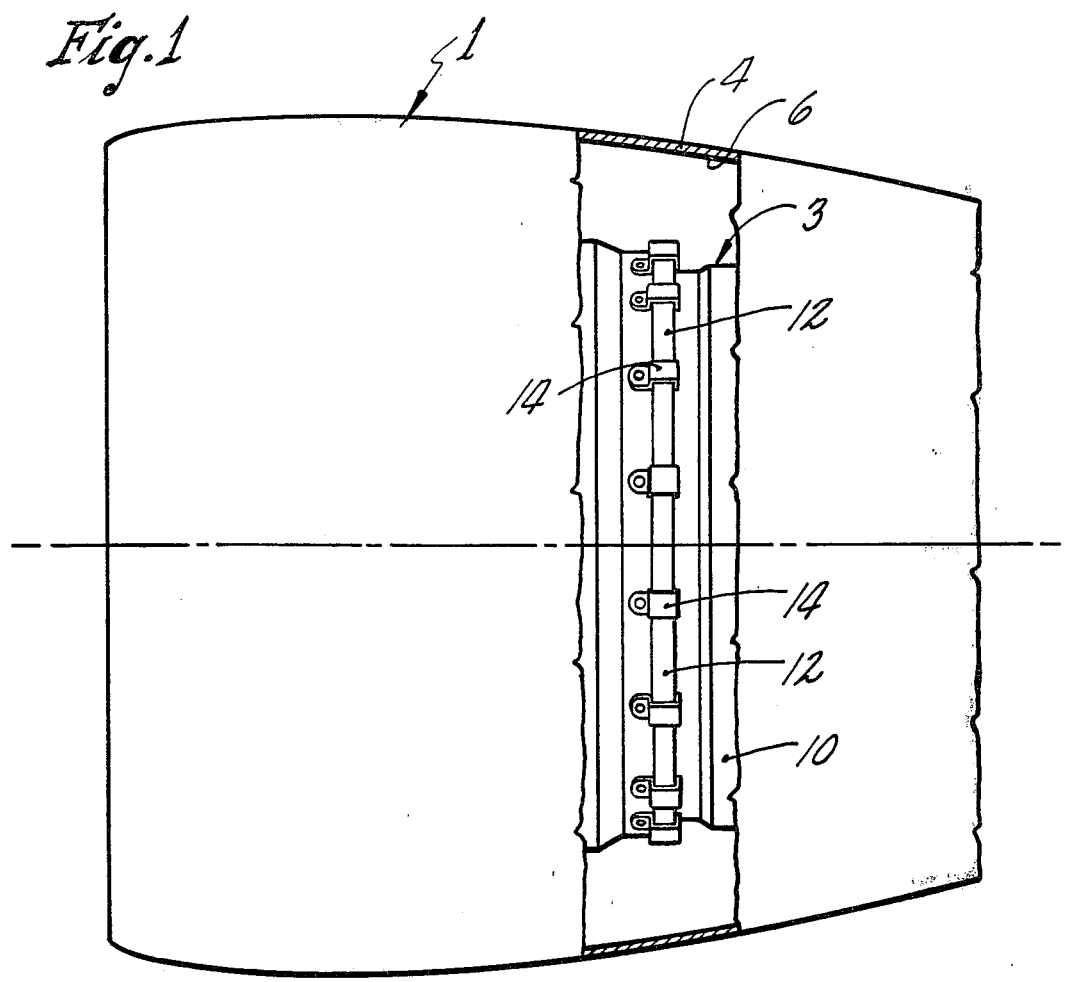
FIG. 1 is a forward view of a gas turbine fan engine with a section broken away showing the location of the bleed port seal strap around the compressor housing.
Figure 2:
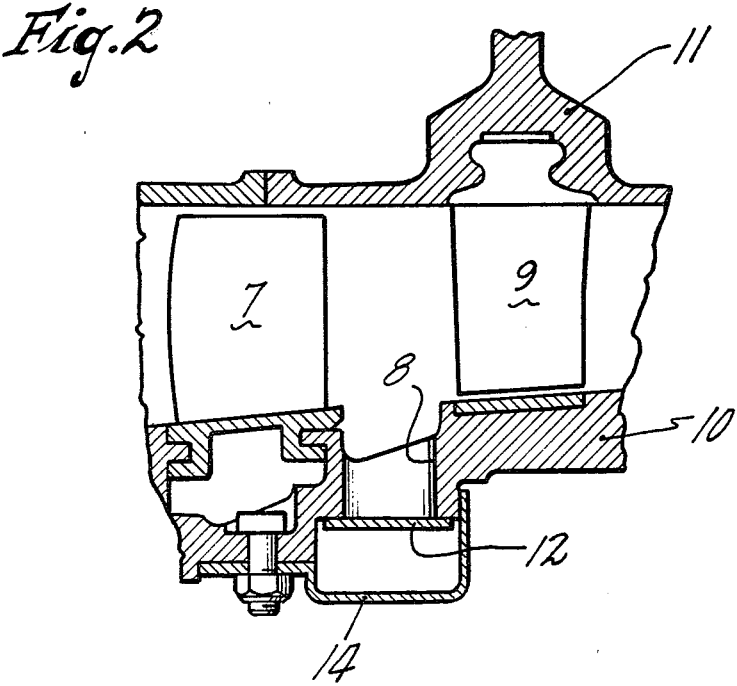
FIG. 2 is an enlarged view of a section of the compressor showing the location of the compressor bleed ports with the seal strap closing them.
Figure 4:
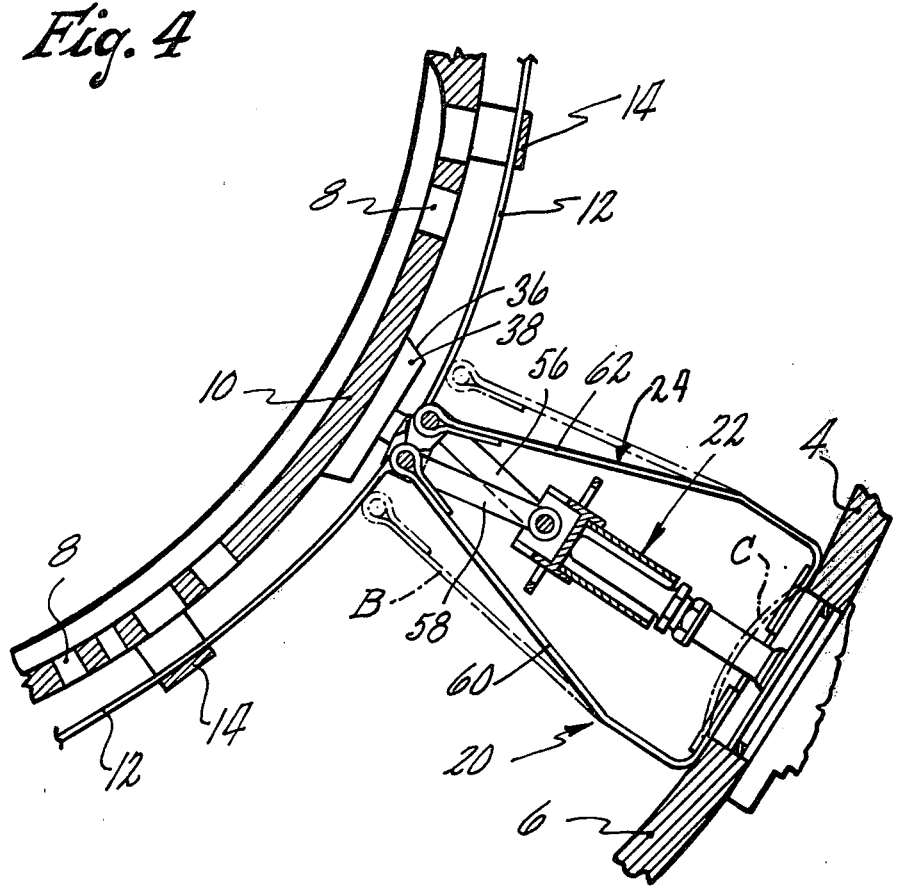
FIG. 4 is a view of a portion of FIG. 3 with the flexure element positioning the bleed port seal strap in its open position.
Figure 5:
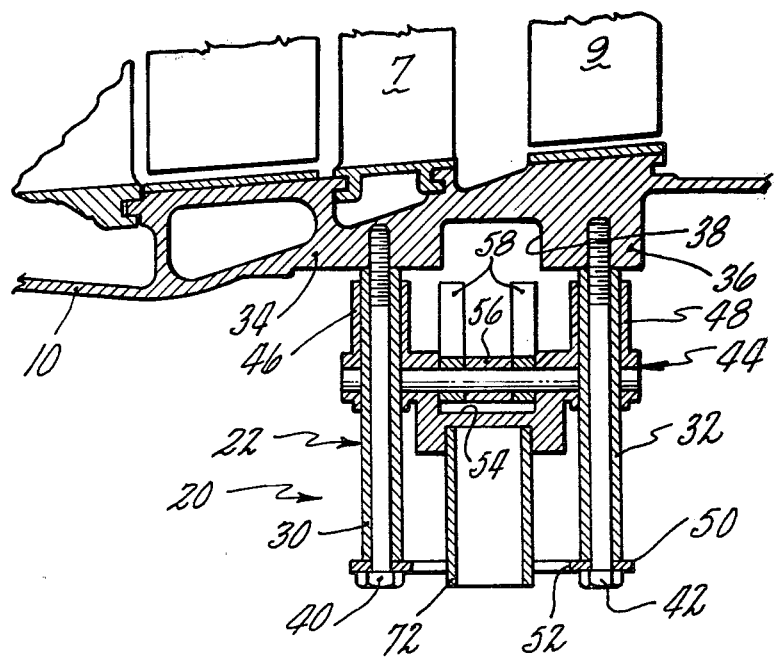
FIG. 5 is a longitudinal view taken along line A of FIG. 3 showing a portion of the actuating means which is attached to the ends of the bleed port seal strap and compressor housing (with straps omitted)

Referring to FIG. 1, a gas turbine power plant 1 is shown of the fan type. A core engine 3 is located within outer housing 4 forming a fan duct 6. A plurality of compressor bleed ports 8 are located around the circumference of a compressor in its housing 10 and a compressor bleed port seal strap 12 is located around the circumference of said compressor housing 10 aligned with said bleed ports 8 where it can be moved between a position closing the bleed ports, as shown in FIGS. 2 and 3, to a position where it can open said bleed ports 8, as show in FIG. 4. Bleed ports 8 are located between a circumferential row of vanes 7 and a circumferential row of blades 9. Vanes 7 are fixed to the inner surface of the compressor housing 10 by well known means and the compressor blades 9 are attached to a rotor 11 by well known means. Clips 14 are fixed to the compressor housing 10 around the circumference of the compressor adjacent the compressor bleed ports 8, said clips confining the movement of said bleed port seal strap 12 between its open and closed position.

The actuating means 20 comprises three main parts: (1) mechanism 22 connecting the ends of the bleed port seal strap 12 to the compressor housing so that they will move in a predetermined path; (2) a flexure element 24 which is fixedly mounted to outer casing 4 and to mechanism 22 for biasing said bleed port seal strap 12 to its open position; and (3) an actuator 26 which is fixed to outer casing 4 which has an actuator rod 28 for moving said mechanism 22 in a direction towards said compressor housing 10 to close said bleed ports.

Actuating means 20 comprises two guide rods 30 and 32 which are axially aligned along the compressor housing 10 with each having one end fixed to a raised boss 34 and 36, respectively. Bolts 40 and 42 extend through guide rods 30 and 32, respectively, and fix the guide rods 30 and 32 to the compressor housing 10. An opening 38 is provided between said bosses 34 and 36 to permit the strap to pass therethrough.

An actuating guide 44 is formed having a short cylindrical member 46 on one side and a short cylindrical member 48 on the other side which are positioned over guide rods 30 and 32, respectively, permitting the actuating guide 44 to have a desired amount of travel thereon. The free ends of the guide rods 30 and 32 are connected by a connecting strap 50 having an opening 52 therein to permit a portion of the actuating guide 44 to pass therethrough.

The actuating guide 44 has a recess 54 therein facing the compressor housing 10 for receiving the ends of a center link 56 and two outer links 58 which are in turn connected to the free ends of bleed port seal strap 12 and flexure element 24 in a manner to be hereinafter described.

The flexure element 24 is formed basically as a U-shaped member formed of a flat metal spring-like material which forms two cantilevered beams 60 and 62 when the bottom portion of the flexure element is bolted in position on the inside of outer casing 4 acting as leaf springs. This is shown in FIG. 3 as being held by bolts 64. Other holding means can be used and a holding plate 66 can be used if desired. The flexure element 24 has a free standing position B, shown in phantom, in FIG. 4 and when the flexure element 24 is installed, a predetermined load exists biasing the free ends of the cantilevered beams 60 and 62, to the position shown in FIG. 4. This predetermined load can be placed on the cantilevered beams 60 and 62 by having the free standing position of flexure element 24 formed with its bottom curved upwardly as shown at C in FIG. 4. When the bottom of the flexure element 24 is forced flat against the outer casing 4, as by bolts 64 and holding plate 66, the cantilevered beams 60 and 62 will have a predetermined load placed thereon. The cantilevered beams 60 and 62 provide the necessary return force to insure that the bleed port seal strap 12 is in its open position when no force is applied from actuator 26 through rod 28.

Actuator 26 is mounted in a housing 70 on the exterior of the outer casing 4. While this actuator is shown as a hydraulic actuator, other actuators can be used. Its actuator rod 28 extends through an opening in the outer casing 4 and the bottom of flexure element 24 and holding plate 66. The actuating guide 44 has a cylindrical portion 72 which extends through opening 52 of connecting strap 50. The end of actuator rod 28 extends into cylindrical portion 62 and abuts the bottom thereof so that an inward movement of actuator rod 28 biases actuating guide 44 inwardly closing the bleed ports 8 by bleed port seal straps 12. This is closed by the spreading of links 58 and 56 which are in turn connected to the ends 80 and 82, respectively, of the bleed port seal strap 12 and to the free ends of the cantilevered beams 62 and 60, respectively. Center link 56 is positioned in the forked end 80 of seal strap 12 and the ends of the two outer links 58 are placed on each side of the single projection at the end 82 of seal strap 12; the ends of the links 56 and 58 and the cooperating ends 80 and 82 of the seal strap 12 are each placed between abutting projections 90 and 92 of the free ends of the cantilevered beams 62 and 60, respectively. It can be seen that this movement spreads the cantilevered beams 60 and 62 to the position shown in FIG. 3 where they will open said bleed ports 8 when the force from the actuator 70 is removed by the withdrawal of actuator rod 28. The flexure element 24 will then move the bleed port seal strap 12 to the position shown in FIG. 4.

I claim:

1. A fan engine having a core engine with a fan duct therearound, said core engine having a compressor section with a compressor housing, a plurality of compressor bleed ports located in said compressor housing around a circumference thereof, a seal strap positioned around said compressor section aligned with said bleed ports, said seal strap being movable between an open position where it is spaced from said bleed ports and a closed position where it is placed against said bleed ports, an actuating means for said seal strap being positioned between said compressor housing and said fan duct, one end of said seal strap being forked, the other end of said seal strap being a single member sized to fit between said forked end, a U-shaped flexible member, means connecting the bottom of said U-shaped flexible member to the interior of said fan duct, one leg of said U-shaped flexible member having its end attached to the forked end of said seal strap, the other leg of said U-shaped flexible member having its end attached to the single member end of said seal strap, said U-shaped flexible member biasing said seal strap to its open position, actuating means for moving said seal strap to its closed position.

2. A combination as set forth in claim 1 wherein said legs of said U-shaped flexible member taper inwardly as they extend from the fan duct to the end attached to the seal strap.

3. A combination as set forth in claim 1 wherein said U-shaped flexible member has a free-standing position with its legs located between their position biasing said seal strap to its open position and their position placing said seal strap in its closed position by said actuating means, means placing a predetermined load on said U-shaped flexible member placing it with its legs positioned to bias said seal strap to its open position.

4. A combination as set forth in claim 2 wherein each leg of said U-shaped flexible member forms a cantilever beam.

* * * * *